(12) United States Patent
Neumann et al.

(10) Patent No.: US 7,012,272 B2
(45) Date of Patent: Mar. 14, 2006

(54) METHOD FOR MEASURING THE FILLING LEVEL OF A LIQUID IN A CAVITY HAVING A SUB-MM WIDE OPENING

(75) Inventors: Rudolf Neumann, Spaichingen (DE); Stefan Stoecker, Bergisch Gladbach (DE)

(73) Assignee: Minebea Co., Ltd., (JP)

( * ) Notice: Subject to any disclaimer, the term of this patent is extended or adjusted under 35 U.S.C. 154(b) by 0 days.

(21) Appl. No.: 10/965,482

(22) Filed: Oct. 14, 2004

(65) Prior Publication Data

US 2005/0094148 A1    May 5, 2005

(30) Foreign Application Priority Data

Oct. 30, 2003   (DE) .............................. 103 50 716

(51) Int. Cl.
*G01N 21/85*   (2006.01)
*G01N 21/49*   (2006.01)
*G01N 15/06*   (2006.01)

(52) U.S. Cl. .................... 250/577; 356/436; 340/619; 73/290 R

(58) Field of Classification Search ............... 250/577, 250/900; 340/619
See application file for complete search history.

(56) References Cited

U.S. PATENT DOCUMENTS 6,586,760 B1 *   7/2003   Ross et al. .................. 250/577

* cited by examiner

*Primary Examiner*—Georgia Epps
*Assistant Examiner*—Suezu Ellis
(74) *Attorney, Agent, or Firm*—Cooper & Dunham LLP

(57) ABSTRACT

The invention relates to a method to optically measure the filling level of a liquid in a cavity having a sub-mm wide opening with the aid of a measuring sensor based on chromatic coding, the measuring sensor delivering a distance value and an intensity value as its output signal.

The method is characterized by the steps:
Recording a distance profile and an intensity profile of the surface of the liquid by moving the measuring sensor along the opening of the cavity holding the liquid, the movement being made essentially parallel to the surface of the fluid along a measurement segment x, and
determining the filling level by means of a combined analysis of the recorded distance profile and intensity profile.

3 Claims, 2 Drawing Sheets

METHOD FOR MEASURING THE FILLING LEVEL OF A LIQUID IN A CAVITY HAVING A SUB-MM WIDE OPENING

BACKGROUND OF THE INVENTION

The invention relates to a method for measuring the filling level of a liquid in a cavity having a sub-mm wide opening. In general, the invention relates to the field of non-contact optical distance measuring technology.

OUTLINE OF THE PRIOR ART

In a hydrodynamic fluid bearing of the kind employed in spindle motors for example, the bearing gap has to be filled with a lubricating fluid, such as oil, before the motor is put into operation for the first time. Here, the filling level of the lubricant in the bearing gap is critical and goes to determine, among other factors, the useful life of the bearing. The bearing gap and also the opening for filling in and measuring the filling level of the lubricant, are very small and lie in the sub-mm range.

In a preferred embodiment of such a bearing, at one of its ends, the bearing tube has a tapered area taking the form of a conical or cylindrical counterbore, whereas the opposite end of the bearing is hermetically sealed. The countersink in the bearing tube goes to form a concentric tapered area between the inner surface of the tube and the outer surface of the shaft that widens towards the top end and is proportionately filled with bearing oil. The oil covers the surfaces of the tube and shaft as a result of which a meniscus, having a concave surface, is formed on the contact surface to the air. The bearing oil in the tapered area acts as a lubricant reservoir from which evaporated bearing oil is replaced. The area above the meniscus between the inner sleeve surface of the cone and the outer sleeve surface of the shaft acts as an equalizing volume into which the bearing oil can rise when its temperature-dependent volume increases as the temperature rises and thus causes the fluid level to increase. The cohesive forces acting in the fluid of the lubricant, supported by the capillary forces in the bearing gap, prevent liquid bearing oil from escaping from the bearing and penetrating into the clean room area.

It is clear that measuring the filling level in the lubricant reservoir of a fluid bearing is not a trivial matter and is made more difficult by the formation of a meniscus. Special measuring techniques are therefore necessary to measure the filling level. To date, the filling level of the lubricant has been measured using a geometrical optics method. A well-known measuring technique is based on directing parallel light to a reference surface and to the surface of the lubricant. The distance between the reflection maxima allows the filling level of the lubricant in the reservoir to be determined.

This measuring technique, however, is only suitable for sufficiently large cavity openings. This method does not work in the case of a fluid bearing having very small bearing gaps. Furthermore, a numerical distance value is not provided.

SUMMARY OF THE INVENTION

The object of the invention is to provide a method for measuring the filling level of a liquid in a cavity having a sub-mm wide opening which provides exact filling level values even for an opening having the smallest dimensions.

This object has been achieved in accordance with the invention by the characteristics outlined in patent claim 1.

Beneficial embodiments of the invention are outlined in the dependent claims.

The invention is based on a method belonging to the field of non-contact distance measuring technology and, in particular, on an optical measuring technique based on a wavelength-dependent, that is chromatic, coding of the area that is to be measured. This chromatic measuring technique in itself is known.

This measuring technique has been put into practice, for example, in the optical micrometer measuring sensor FRT-CWL made by FRT GmbH, which is a chromatic white light sensor. The sensor is well suited for measuring contour, roughness and topography. To determine the distance to a sample surface, this surface is illuminated with a focused white light which is fed from a light source via a fiber optic cable to the sample. Passive optics having a large chromatic aberration split the light vertically in focus points of various colors, and thus height, and is reproduced on the sample. The chromatic aberration results in a strong wavelength-dependent focal length for this reproduction. If an optical surface is now located within this focal range, only the wavelength whose focus lies on the surface is sharply reproduced. Conversely, only the reflection of this wavelength is again reproduced sharply at the end of the optic fiber and coupled into the fiber (confocal principle). Here, it is not important if the surface reflects in a diffusely scattered or mirror-like way. The light reflected from the sample surface is fed through the same optics and the optic fiber cable to a spectrometer. From the color of the light ascertained there, the position of the focus point can be determined using a calibration table and thus the position of the sample surface. Since the sensor works without using an active control, very rapid measurements on structured surfaces are made possible.

The chromatic white light sensor delivers a distance value and an intensity value as its output signal. In accordance with the invention, the sensor is moved along the opening of a cavity holding the liquid essentially parallel to the surface of the liquid. While the sensor is being moved, distance values and intensity values are continuously measured, producing a distance profile and an intensity profile of the surface of the liquid. The actual filling level of the liquid can be determined from a combined analysis of the distance profile and the intensity profile.

According to the invention, the distance value for which the intensity profile shows its maximum is ascertained to be the filling value. To determine an absolute filling level, the distance value can be compared to the distance of a reference surface and as a result, the level of the fluid determined.

The invention will now be explained in more detail on the basis of an embodiment with reference to the drawings.

BRIEF DESCRIPTION OF THE INVENTION

DESCRIPTION OF A PREFERRED EMBODIMENT OF THE INVENTION

The embodiment describes a hydrodynamic bearing arrangement as employed, for example, in a spindle motor.

Figure 1:
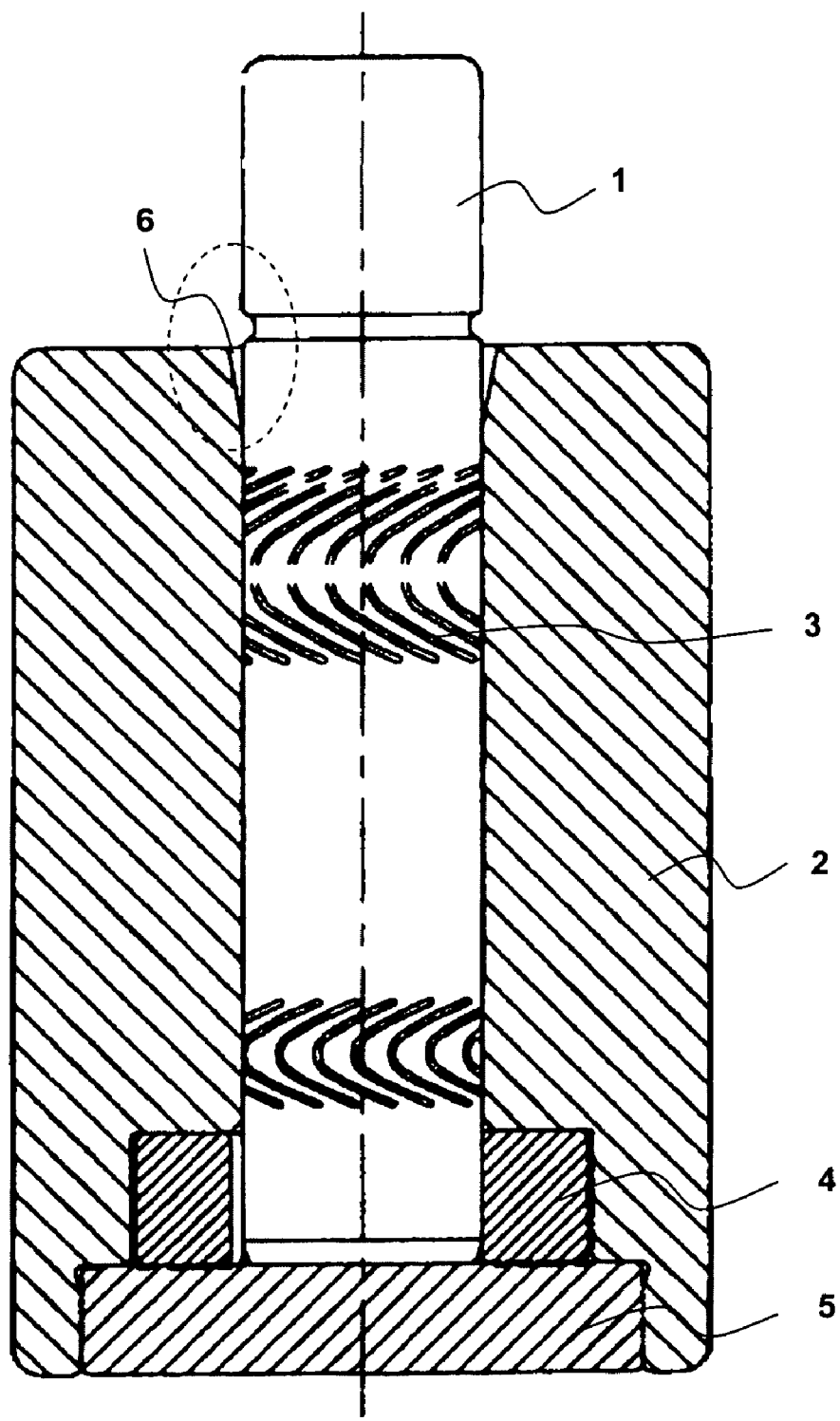
FIG. 1 shows a section through a hydrodynamic bearing arrangement as employed, for example, in spindle motors.

In accordance with FIG. 1, the bearing arrangement comprises a shaft 1 arranged freely rotatably in a bearing tube 2. One of the surfaces of the shaft 1 and/or tube 2 that face each other, the surface of the shaft 1 in the case illustrated, has cylindrical zones engraved with groove patterns 3.

The tube 2 is provided at its bottom end with an annular recess to accommodate a thrust plate 4. In the same way as the shaft 1 rotates in the tube 2, the thrust plate 4, firmly connected to the shaft, rotates in the recess. The lower opening of the tube 2 is hermetically sealed by a cover 5 which prevents air from penetrating into the bearing arrangement.

A liquid lubricant, such as oil, is filled into the bearing gap that is formed between the shaft/thrust plate and bearing sleeve/cover. The groove pattern 3 mentioned above, causes a kind of pumping action to be created when the shaft 1 rotates, leading not only to a build-up of pressure but also to the lubricant being distributed.

At its top end, the bearing tube 2 has a tapered area taking the form, for example, of a conical counterbore which, together with the outside diameter of the shaft 1, forms a reservoir 6 to hold the lubricant. The reservoir 6 has its largest diameter at the top end of the tube 2.

Figures 2, 3:
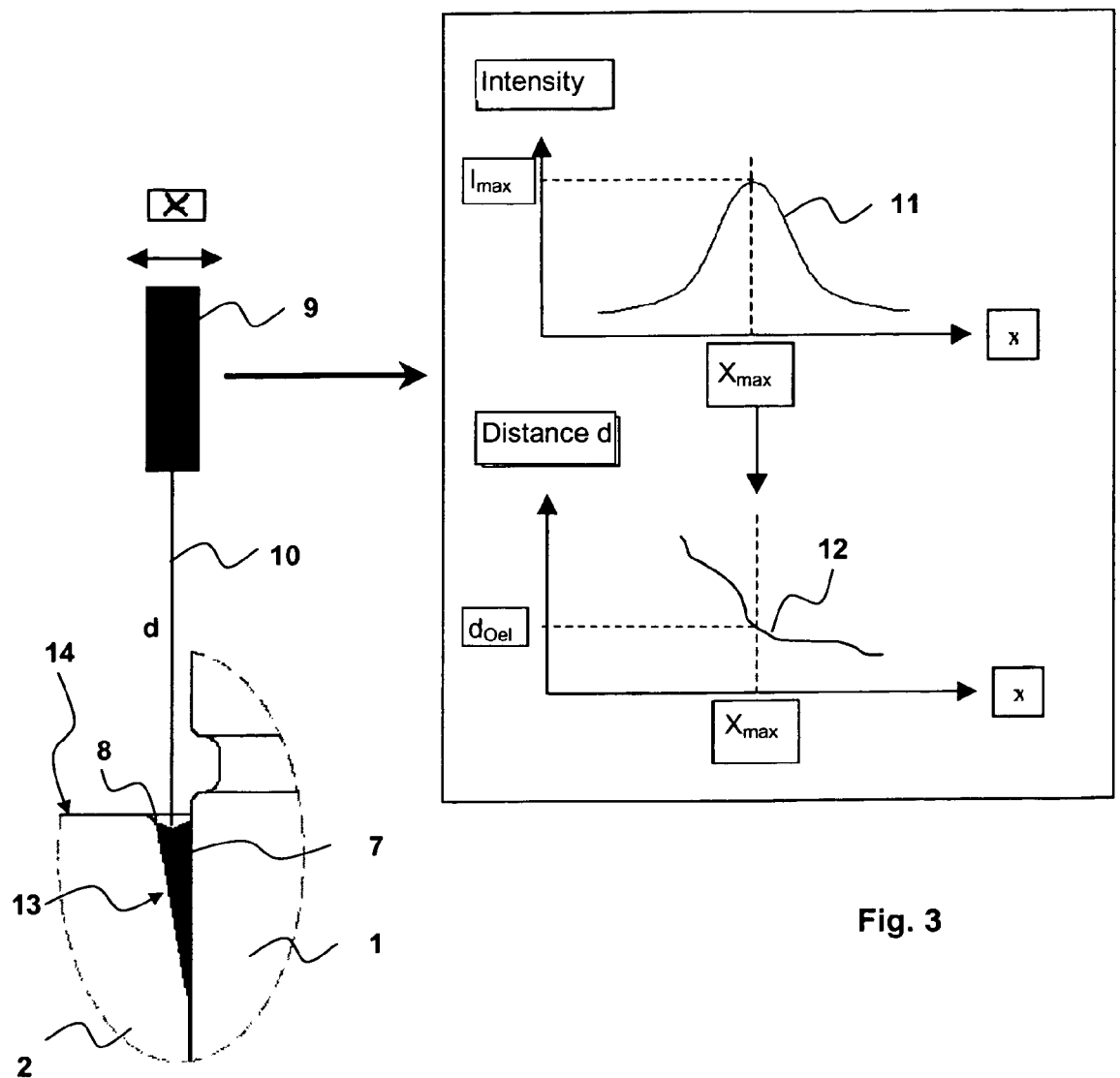
FIG. 2 shows the measurement arrangement on the basis of an enlarged view of the bearing arrangement in the region of the lubricant reservoir.
FIG. 3 shows the output signal delivered by the optical sensor in the form of an intensity and distance profile.

When the bearing arrangement has been completed, the reservoir 6 can be filled with the lubricant 7 in accordance with FIG. 2. The filling level of the lubricant 7 in the reservoir 6 can now be optically checked using the lubricant meniscus 8 that is built up in the reservoir 6 due to capillary action.

The measuring technique according to the invention will be explained on the basis of FIGS. 2 and 3. A chromatic white light sensor 9 is arranged in such a way that it looks perpendicularly into the opening in the lubricant reservoir 6. The light beam 10 emitted by the sensor 9 hits the surface of the lubricant defined by the meniscus 8. The light reflected from the surface 8 is fed to a spectrometer of the measuring arrangement (not illustrated). From the color of the light determined there, the position of the focus point can be determined using a calibration table and thus the distance d between the sensor and the surface of the lubricant 8. During the measuring process, the sensor 9 is moved in a lateral direction along a measurement segment x parallel to the opening in the reservoir 6. The distance between the sensor 9 and the surface of the lubricant 8 and the intensity of the light reflected from the surface of the lubricant are constantly measured. This goes to produce an intensity profile 11 and a distance profile 12 over the measurement segment x, as shown by way of example in FIG. 3.

It can be clearly seen that the distance profile 12 does not follow the concave course of the lubricant meniscus 8 as expected, but falls steadily over the measurement segment x. The main reason for this is the extraneous reflection of the light 10 emitted by the sensor 9 off the sloping surface 13 of the bearing tube 2 that forms the side wall of the reservoir 6. This means that the actual level of the liquid that corresponds to the meniscus 8 minimum cannot be determined from the distance profile alone. The distance value d at which the surface of the meniscus 8 is at its lowest point (minimum) has to be found.

According to the invention, the solution to this problem lies in analyzing the intensity profile 11 in addition to the distance profile. The intensity profile shows that the intensity of the reflected light runs reciprocally to the curve of the meniscus and is at its greatest when the light beam 10 is reflected exactly perpendicularly back into the sensor 9 from the surface of the meniscus. This point, indicated here as intensity maximum $I_{max}$, defines the lowest point of the meniscus. The lateral position $x_{Max}$ associated with the intensity maximum, can now be applied to the distance profile. The distance value $d_{Oel}$ taken at position $x_{max}$ represents the sought after filling level of the lubricant.

The absolute value of the filling level can be determined by comparing the measured distance value d with a reference value, for example, the distance between the sensor 9 and the top surface 14 of the bearing tube 2.

IDENTIFICATION REFERENCE LIST

1 Shaft
2 Bearing tube
3 Groove pattern
4 Thrust plate
5 Cover
6 Reservoir
7 Lubricant
8 Meniscus
9 Optical sensor
10 Light beam
11 intensity profile
12 Distance profile
13 Sloping surface
14 Surface

The invention claimed is:

1. A method to optically measure the filling level of a liquid in a cavity having a sub-mm wide opening with the aid of a measuring sensor based on chromatic coding, the measuring sensor delivering a distance value and an intensity value as its output signal,
    characterized by the steps,
    recording a distance profile and an intensity profile of the surface of the liquid by moving the measuring sensor along the opening of the cavity holding the liquid, the movement being made essentially parallel to the surface of the fluid along a measurement segment x, and
    determining the filling level by means of a combined analysis of the recorded distance profile and intensity profile.

2. A method according to claim 1, characterized in that the distance value for which the intensity profile shows its maximum is ascertained to be the filling value.

3. A method according to claim 1 or 2, characterized in that the measured distance value is compared to the distance of a reference surface and as a result, the level of the fluid is determined.

* * * * *